INVENTOR.
Harold N. Seyferth

Oct. 11, 1955  H. N. SEYFERTH  2,720,141
MACHINE TOOLS
Filed Oct. 10, 1950  9 Sheets-Sheet 5

INVENTOR.
Harold N. Seyferth
BY Carlson, Pitzner,
Hubbard & Wolfe
Attys.

Oct. 11, 1955     H. N. SEYFERTH     2,720,141
MACHINE TOOLS

Filed Oct. 10, 1950                            9 Sheets-Sheet 7

INVENTOR.
Harold N. Seyferth
BY
Carlson, Pitzner, Hubbard & Wolfe
Attys.

United States Patent Office 2,720,141
Patented Oct. 11, 1955

2,720,141

MACHINE TOOLS

Harold N. Seyferth, East Detroit, Mich., assignor to Ex-Cell-O Corporation, Detroit, Mich., a corporation of Michigan Application October 10, 1950, Serial No. 189,371

18 Claims. (Cl. 90—13.9)

The invention relates to machine tools for shaping articles having irregularly curved surfaces and it is more particularly concerned with an improved machine tool for generating such surfaces.

The machine tool which constitutes the subject matter of the present invention is particularly well adapted for, although not limited to, machining turbine blades. Such blades characteristically exhibit complex curved surfaces. In a typical turbine blade, for example, any plane at right angles to the blade axis intersects a section of airfoil contour so that opposite faces of the blade respectively present convex and concave surface contours. In some types of blades the airfoil sections, taken progressively along the blade axis, exhibit blade faces of a spiral or twisted configuration somewhat similar to the warped surfaces of propeller blades occasioned by the differing helix angles found at different radii from the propeller axis. The width of the blade faces may also vary progressively along the blade axis. It will be apparent, therefore, that the surface contours of turbine blades generally lack the straight or regular curved lines that can be generated by conventional machine tools.

With the above in view, a general object of the invention is to provide an improved machine tool capable of generating complex curved surfaces such as those exhibited by turbine blades and which, moreover, is capable of producing such blades rapidly with a minimum of labor and with a higher degree of precision than has been attainable heretofore.

Another object is to provide a machine tool in which the generation of complex irregularly curved surfaces may be effected with a high degree of precision under control of a simple barrel type cam capable of being produced quickly and cheaply from a master pattern displaying the desired surface contour.

Another object is to provide mechanism for indexing a workpiece to present successive areas for shaping by a cutting tool which is readily adjustable to vary the number and length of the indexing steps for the accurate generation of complex irregularly curved surfaces.

Another object is to provide back-up mechanism for irregularly shaped workpieces embodying novel features of construction which enables the mechanism to adjust itself quickly to conform closely to the contour of the surface with which it is required to operate and which is rigidly retained in adjusted position while the machining of the workpiece takes place.

Still another object is to provide improved controls for coordinating the back-up and adjusting actions of the mechanism with other operations of the machine tool with which it is incorporated.

A further object is to provide a simple and efficient mounting for supporting and guiding a machine tool element such as a slide for both linear translation and pivotal movement about an axis parallel to its translatory path.

It is also an object of the invention to provide improved controls for machine tools adapted to produce articles with complex curved surfaces which render their operation substantially automatic and which effectively eliminate any need for supervision after a machine cycle has been started.

Other objects and advantages of the invention will become apparent from the following detailed description of the preferred embodiment illustrated in the accompanying drawings, in which:

For purposes of illustration the invention has been shown as embodied in a milling machine. It will be appreciated, however, that various features of the invention are readily applicable to other types of machine tools and consequently there is no intention of limiting the invention to the particular type of machine tool disclosed. It will also be understood that various changes and modifications may be made in the form, construction and arrangement of the parts entering into the construction of the machine tool without departing from the spirit and scope of the invention as expressed in the appended claims.

Figure 1:
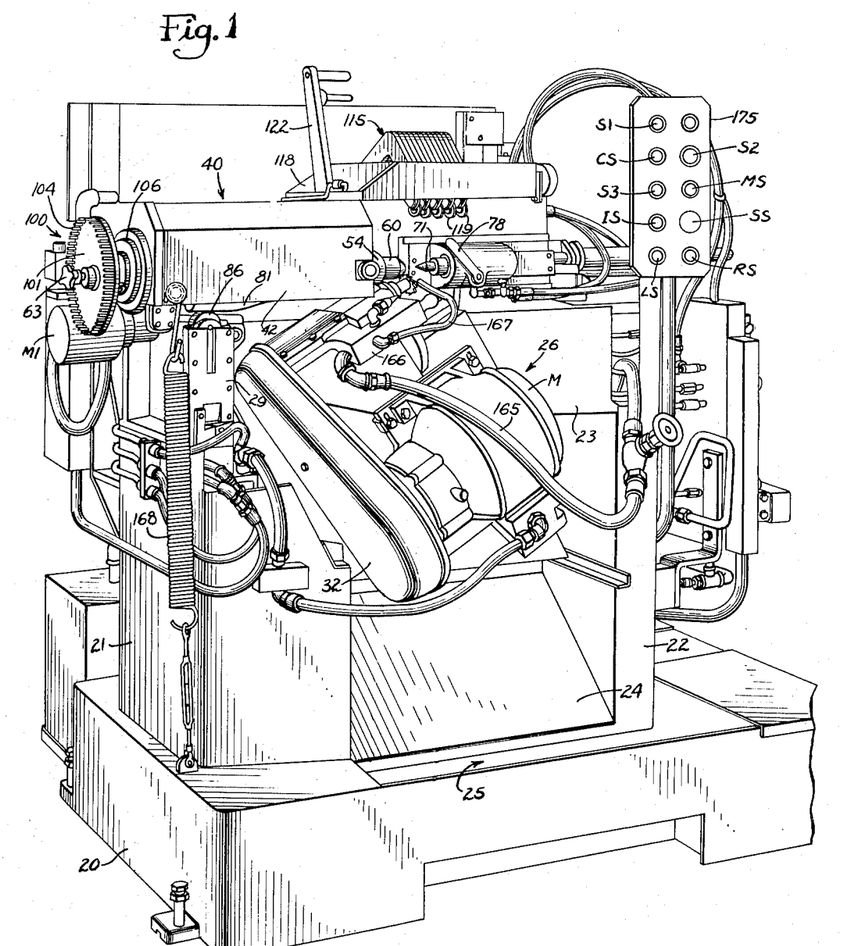
Figure 1 is a perspective view of a machine tool embodying the features of the invention.

Referring to Fig. 1 of the drawings, the exemplary machine tool comprises a generally rectangular box-like base 20 from which rises an upright frame including a pair of end members 21 and 22 joined adjacent their upper ends by an inwardly offset vertically disposed web 23. Extending between the end members below the web is an inclined apron 24 which serves to direct metal chips and liquid coolant through an opening 25 in the top wall of the base 20 into a compartment or sump formed within the base.

Figure 3:
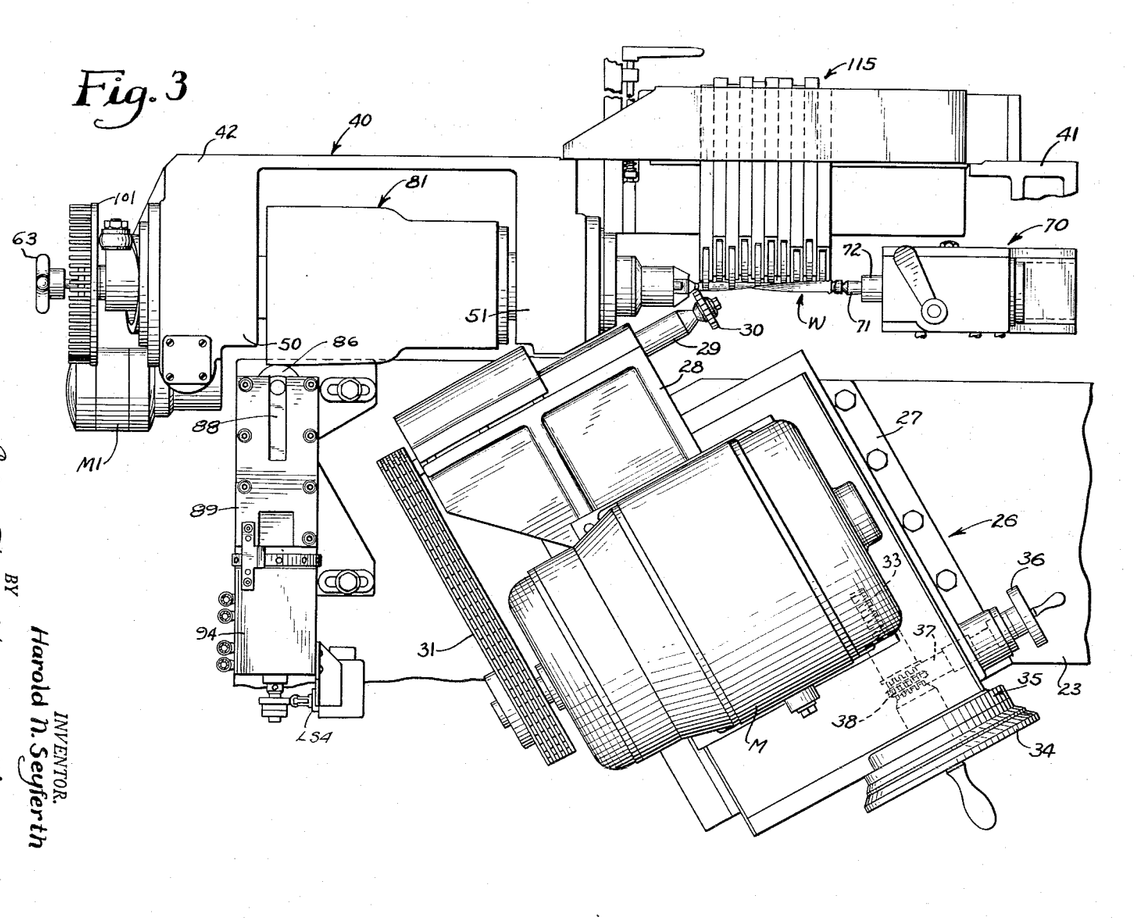
Fig. 3 is a fragmentary front view of the machine shown in Fig. 1.

Supported on the machine frame is a cuttter spindle and drive assembly 26 which may be of conventional construction. As shown in Fig. 3, the illustrative assembly comprises a base member 27 bolted or otherwise suitably secured to the web 23 of the frame. The base member 27 supports and guides a slide 28, at the upper end of which is journaled a rotary tool spindle 29 which projects at one side of the slide and carries a suitable cutting tool, in this instance a milling cutter 30. Also mounted on the slide 28 is a motor M arranged to rotatably drive the spindle 29 through the medium of a driving belt 31. Preferably the belt and associated rotating elements are enclosed by a guard 32.

In the particular machine illustrated, the spindle and drive assembly 26 is mounted so that the slide is movable in an inclined but generally vertical path. The cutter spindle 29 is arranged transversely of this path so that its axis is in intersecting right angularly disposed planes, one of which is vertical and the other inclined to the horizontal. With this arrangement the vertical position of the cutting edge of the cutter 30 may be adjusted to compensate for changes in diameter by translation of the slide 28 relative to the base member 27.

Figure 2:
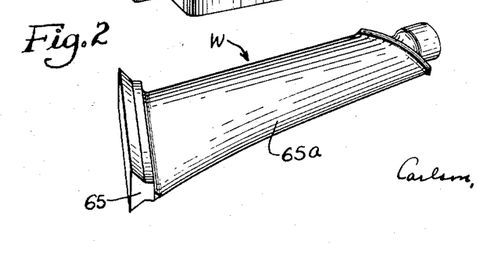
Fig. 2 is a perspective view of a typical article on which the machine is adapted to operate, the article, in this instance, being a turbine blade.

Adjustment of the spindle slide 28 is effected by a feed screw 33 (Fig. 2) journaled in the base member 27 and adapted to be rotated by a hand wheel 34 located adjacent the lower edge of the base member. To facilitate adjustment the peripheral surfaces of the wheel are preferably graduated as indicated at 35 for cooperation with a suitable indexing mark on the base member. Adjustment of the slide may also be effected by an auxiliary hand wheel 36 herein shown as located at one side of the base member. The auxiliary hand wheel is arranged to turn the feed screw 33 through the medium of across shaft 37 and a worm 38 cooperating with a worm wheel fixed to the feed screw.

Mounted on the top of the machine frame is a second frame 40 adapted to support a workpiece W (Figs. 3, 6 and 12) in operative relation to the cutter 30. To enable the machine to generate a curved surface on the workpiece, the auxiliary frame is mounted for movement in at least two directions substantially at right angles to each other for effecting both feed and traverse movements of the work relative to the tool. Thus in the exemplary machine, the frame 40 is mounted for linear translation parallel to the axis of the workpiece and for pivotal movement transversely of the axis of the workpiece. This pivoting movement carries the workpiece toward and from the tool so that the depth of cut taken by the latter may be varied as required by the surface contour. Additionally, provision is made for rotating the workpiece about its longitudinal axis so that successive areas may be presented for action by the tool during the generation of the surface contour.

In the exemplary machine, the auxiliary frame 40 comprises an elongated generally U-shaped member 41 having a forwardly projecting extension 42 adjacent one end. Support for the frame 40 is provided by bearings 43 and 44 (Fig. 4) carried by the depending legs of the frame member 41 and respectively engaging opposite ends of an elongated cylindrical rod 45. Suitable abutment means such as lock nuts 43a threaded on the rod restrain the bearings and rod against relative movement axially of the rod while permitting the frame to pivot freely about the axis of the rod.

The rod 45 extends axially through a cylinder 46 stationarily supported by brackets 47 on the rear portion of the machine frame. A piston 48 fixed to the intermediate portion of the rod is slidably fitted within the cylinder 46. Heads 49, apertured for the passage of the projecting ends of the piston rod close opposite ends of the cylinder 46. It will be appreciated, of course, that suitable packing rings are provided in the cylinder heads for preventing leakage of fluid around the rods.

It will be apparent that the structure above described provides a simple and sturdy mounting for the auxiliary frame 40 affording both linear and pivotal movements.

The linear movements are imparted to the frame by the piston 48 upon introduction of pressure fluid into one end or the other of the cylinder 46. The pivotal movement takes place on the bearings 44 about the axis of the piston rod which is located adjacent the rear edge portion of the auxiliary frame. Accordingly, the weight of the auxiliary frame tends to swing the frame in a downward direction thus carrying the workpiece toward the cutter 30. The extent of this pivotal movement and therefore the positioning of the workpiece relative to the tool is controlled by cam means to be described hereinafter.

Figure 6:
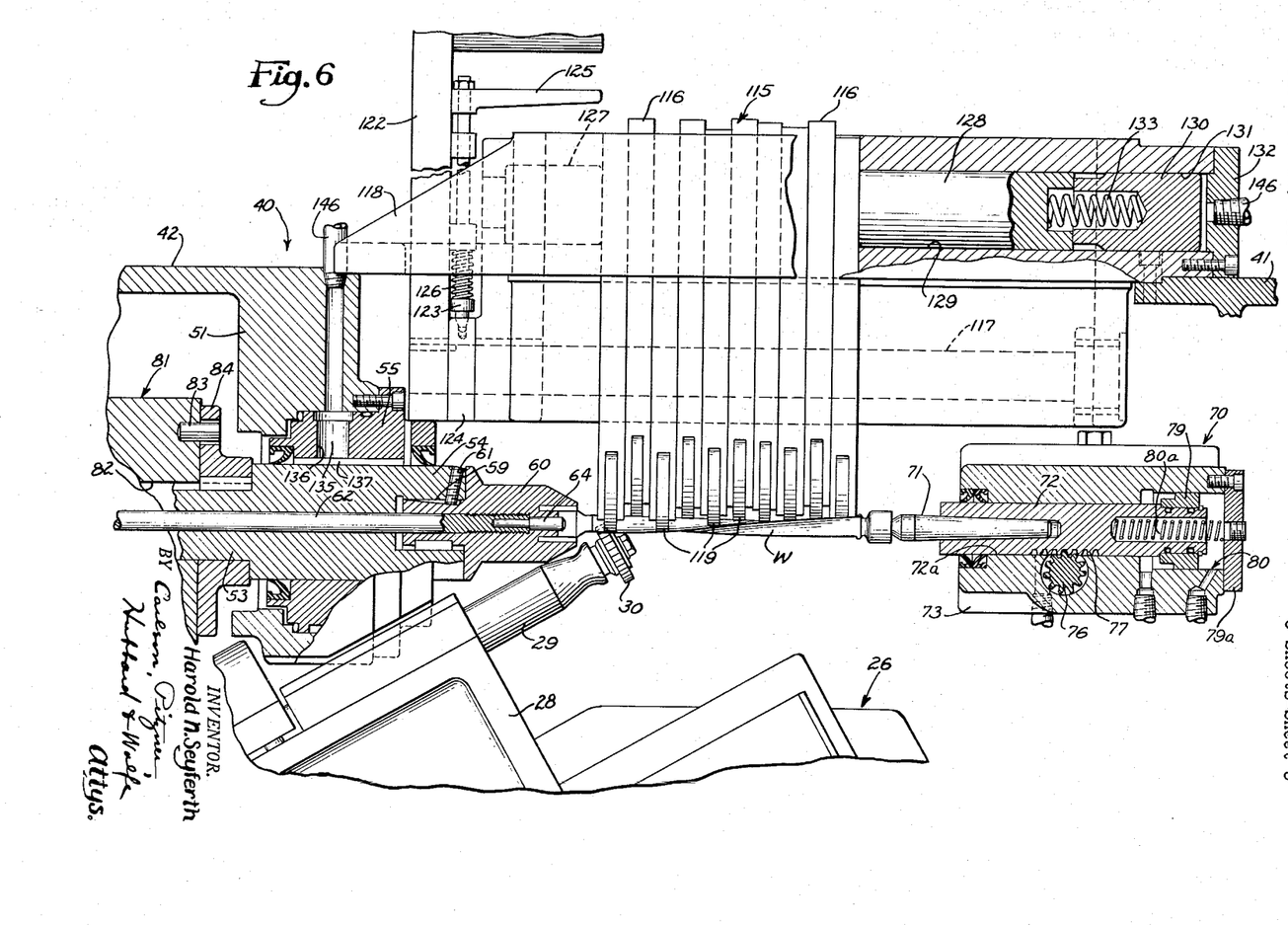
Fig. 6 is a fragmentary sectional view of the work supporting frame taken in a vertical plane through the axis of the work holding spindle.
Figures 7, 10, 11:
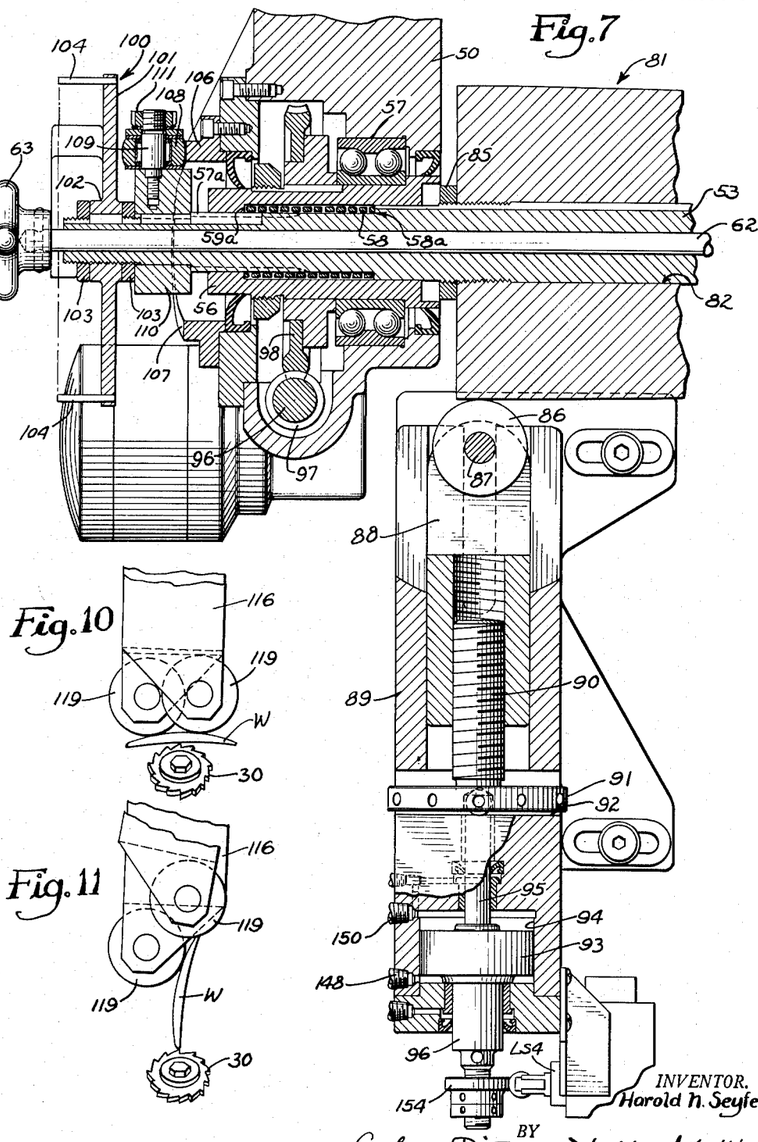
Fig. 7 is a sectional view of the work holding spindle and control cam taken in a vertical plane through the axis of the spindle.
Figs. 10 and 11 are fragmentary views showing the manner in which the back-up mechanism adjusts for cooperation with differently contoured surfaces of a workpiece.

Referring now to Figs. 6 and 7, the forwardly projecting portion 42 of the auxiliary frame 40 includes a pair of side members 50 and 51 spaced apart axially of the frame and journaling a work holding spindle 53. At its inner or work supporting end the spindle 53 terminates in an enlarged head 54 journaled in a bearing 55 mounted on the side member 51. The other end of the spindle extends through a sleeve member 56 journaled in an anti-friction bearing 57 carried by the side member 50. The spindle is non-rotatably secured to the sleeve member as by a key or feather 57a which permits the spindle to move axially of the sleeve member. A coil spring 58 interposed between a shoulder 58a on the spindle and an opposed shoulder 59a on the sleeve member urges the spindle to the right (as viewed in Fig. 7), the extent of such movement being controlled by cam means later to be described.

As shown in Fig. 6, the head portion 54 of the spindle 53 is formed with a recess or socket 59 adapted to receive the shank portion of a chuck 60. The chuck is held securely in place by a set screw 61 threaded into the spindle head and engaging in a tapered slot in the shank. The chuck 60 is preferably of the conventional type having opposed jaws operable to grip or release a workpiece. The chuck jaws are operated by a rod 62 extending through an axial bore in the spindle and threading into the chuck. At the end of the spindle remote from the chuck, the rod 62 projects and is fitted with a knob or wheel 63 by which it may be rotated manually to effect a gripping or releasing action. Upon such turning the rod acts in well-known manner through a pin 64 (Fig. 6) to open or close the jaws of the chuck.

The particular form of the chuck jaws is determined, of course, by the character of the workpiece to be gripped thereby. When the machine is intended to produce turbine blades such as the blade W illustrated in Fig. 2, the chuck jaws are shaped to engage the root portion 65 of the blade. In the exemplary blade, the root portion comprises an enlargement at one end of the concavo-convex spirally twisted blade section 65a extending generally transversely of the blade axis and having opposite side edges machined to present V-shaped configuration for engagement in dovetail slots in the mounting structure. The root portion 65 of the blade may be normal to the blade axis or inclined thereto as shown, in which case the effective length of the blade section varies across the blade.

Figure 5:
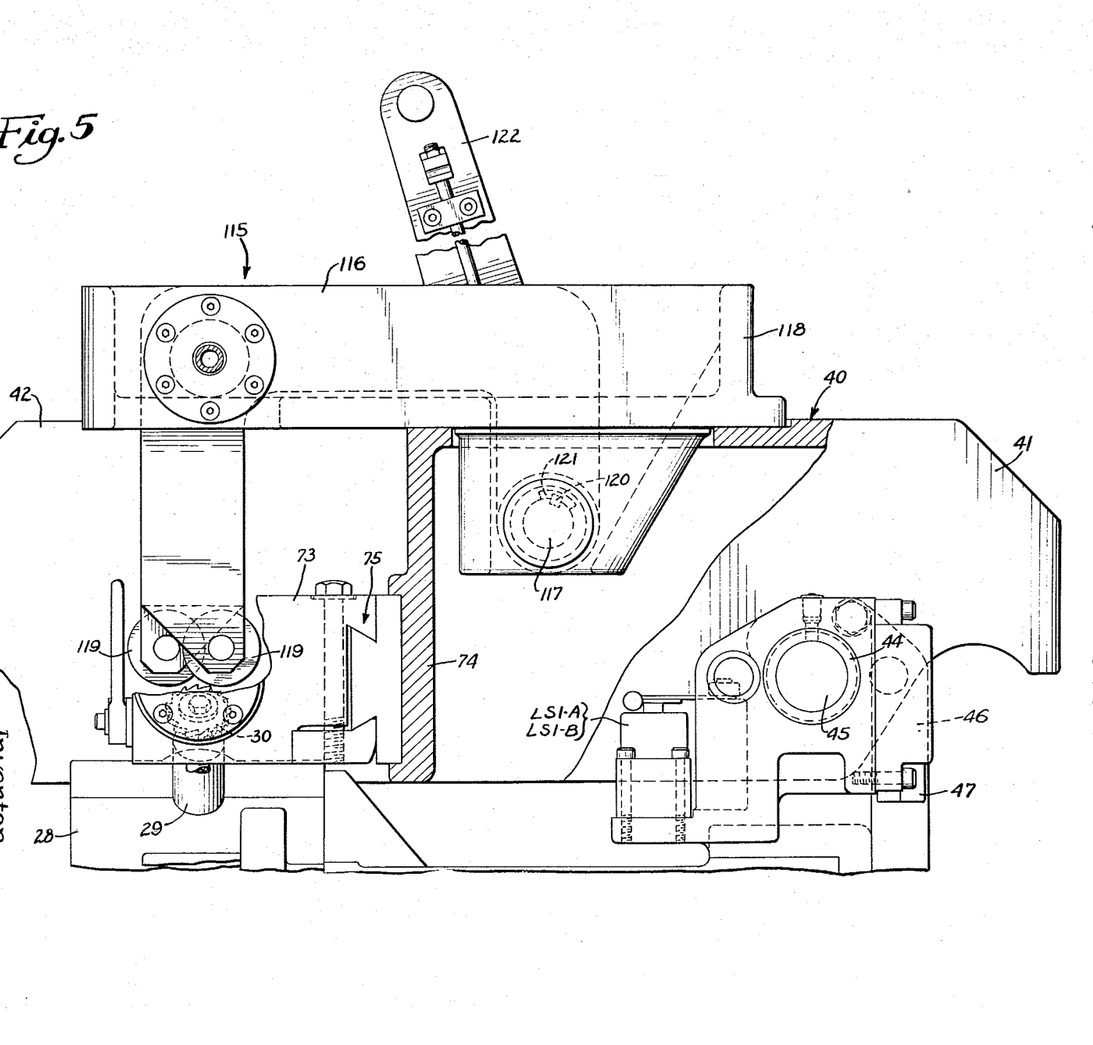
Fig. 5 is an elevational view of the work supporting frame as viewed from the tailstock end, portions of the frame being broken away to show details of the back-up mechanism.

For supporting the tip end of the workpiece, there is provided a tailstock 70 having a center 71 supported in a tapered socket formed in one end of a cylindrical tailstock slide 72 supported in a bore 72a in a bracket 73 which may be adjustably secured to a depending web 74 of the frame member 41 as by a dovetail slide connection 75 (Fig. 5). The center 71 and slide 72 may be advanced and retracted manually through the medium of a pinion 76 engaging rack teeth 77 formed in the slide 72, the pinion being rotatable by means of a hand lever 78. Alternatively, the center and plunger may be advanced and retracted by pressure fluid actuated means including a piston element 79 fixed to the rear end of the plunger 72 and operating in a cylinder 80 formed as an enlargement of the rear end portion of the bore 72a.

The cylinder is closed at its rear end by a removable head 79a. A spring 80a acting between the head and the slide 72 urges the latter outwardly or toward the left as viewed in Fig. 6.

As explained above, the auxiliary or work supporting frame 40 is pivotally supported adjacent its rear edge so that it has a tendency to rock downwardly and feed the workpiece toward the cutter 30. The extent of such rocking movements and therefore the relative position of the tool and work or the depth of cut taken by the tool is controlled by cam means shaped to determine the contour to be machined on the workpiece. Due to the manner in which the work is presented to the cutter 30 in the present machine, the cam means may take the form of a simple barrel type cam 81 (Figs. 3, 6, 7 and 12) mounted on and rotatable with the work carrying spindle 53. The cam, of course, is shaped in accordance with the contour to be formed on the workpiece, such shaping preferably being done in conformity with a master pattern exhibiting the desired contour.

As herein shown the cam is formed with an axial bore 82 adapted to slidably receive the work spindle and is non-rotatably secured thereto in fixed angular relation by a dowel pin 83 carried by a collar 84 keyed to the spindle, the dowel pin engaging in a dowel hole in the adjacent end of the cam, as shown in Fig. 6. A nut 85 threaded on the spindle 53 and bearing against the other end of the cam holds it securely against the collar 84 and against axial movement relative to the spindle.

For cooperation with the cam 81 a follower roller 86 is mounted on the machine frame directly below the cam. As shown in Fig. 7, the follower roller 86 is supported by a shaft 87 adjacent the upper end of a slide 88 gibbed to a bracket 89 bolted or otherwise rigidly secured to the frame member 21 of the machine. The slide 88 is guided for vertical movement in the bracket and the latter is preferably secured to the machine frame so that it can be adjustably positioned horizontally for cooperation with different cams when required.

Provision is made for accurately locating the vertical position of the follower roller 86 and for adjusting such position to determine the axial distance between the work and the cutter 30 when the machine is set up to operate on a particular type of workpiece. For this purpose a stop screw 90 threaded into the lower end of the slide 88 has its head 91 positioned to engage a shoulder or abutment 92 formed on the bracket 89. The screw head 91 may be in the form of a hand wheel for convenience of manipulation and the peripheral surface is preferably graduated for cooperation with a suitable index point on the bracket.

Figure 12:
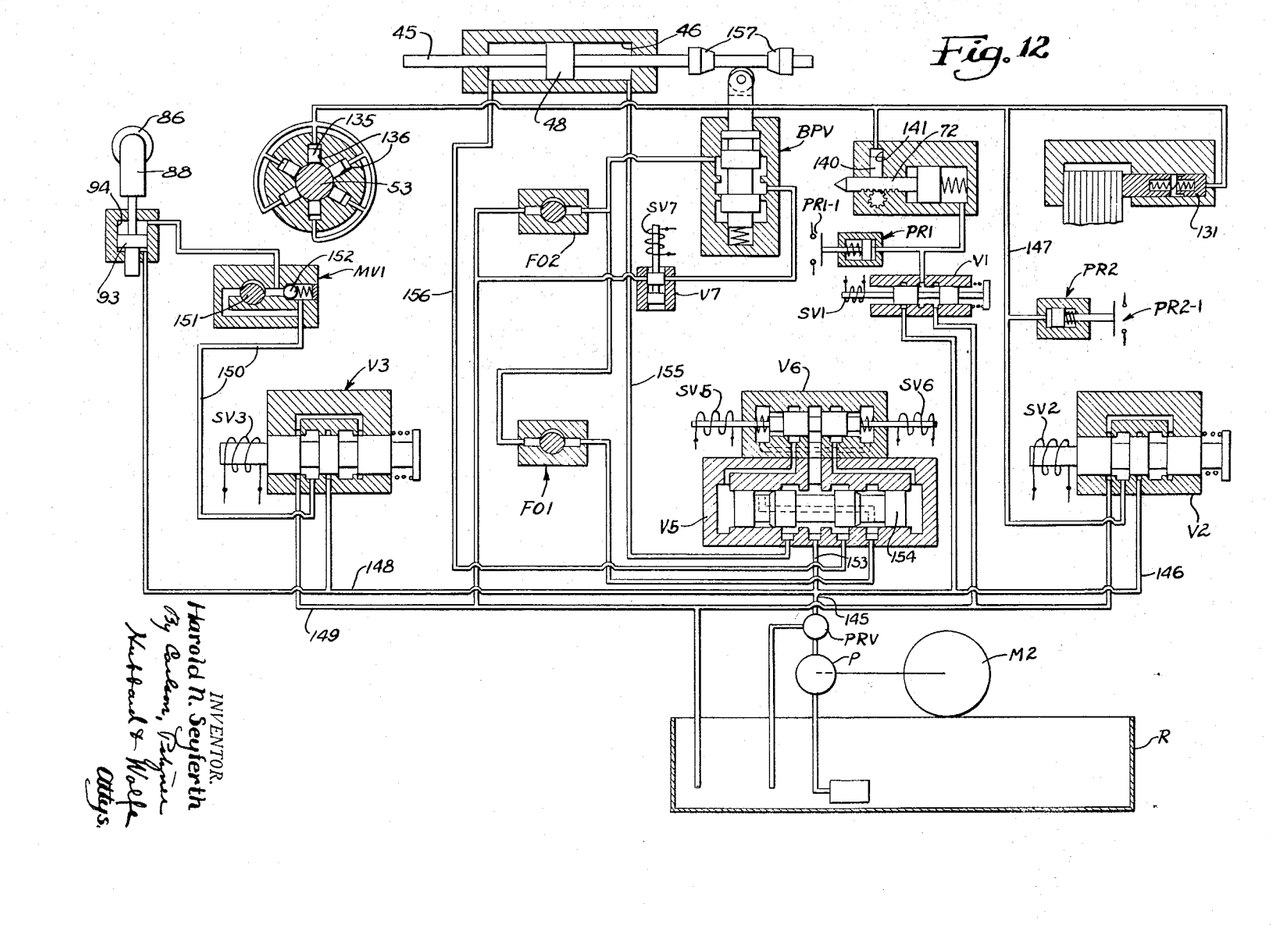
Fig. 12 is a schematic diagram of the hydraulic circuit of the machine.

Power actuated means is also provided for shifting the follower roller 86 vertically to raise and lower the work supporting frame with reference to the cutter 30. Such movements serve to present the work to the cutter at the beginning of a cutting stroke and to retract the work at the end of the stroke. The power actuated means, as shown in Figs. 7 and 12, comprises a piston 93 working in a cylinder 94 formed in the bracket 89 below the abutment 92. The piston 93 has a rod 95 projecting from the upper end of the cylinder 94 and operatively secured in a suitable manner to the lower end of the adjusting screw 90. At its lower end the piston has an axial extension 96 of somewhat greater diameter than the piston rod 95 projecting from the lower end of the cylinder 94 for coaction with control devices to be described presently.

In order to present successive areas of a workpiece to the cutter in successive feed strokes of the supporting frame 40, provision is made for imparting to the work holding spindle 53 intermittent rotary indexing steps of predetermined length. Rotation of the spindle is effected by a motor M1 (Figs. 1, 3, 12 and 14) mounted on the auxiliary frame 40 adjacent the outer end of the spindle. The motor preferably has built-in reduction gearing driving a shaft 96 carrying a worm 97 coacting with a worm wheel 98 keyed to the spindle sleeve 56.

Operation of the motor M1 is controlled by electrical switches operated at predetermined points in the machine cycle, as will be described in detail hereinafter. For present purposes, it is sufficient to note that one of the switches LS4 is actuated by a control device 100 driven in synchronism with the spindle 53. In its preferred form this control device comprises a disk 101 mounted on the outer end of the spindle 53 and rotatable with the spindle. For this purpose the disk 101 has a hub portion 102 keyed to the spindle 53 and held against axial movement thereon by opposed clamp nuts 103 threaded on the spindle on opposite sides of the hub.

Figure 8:
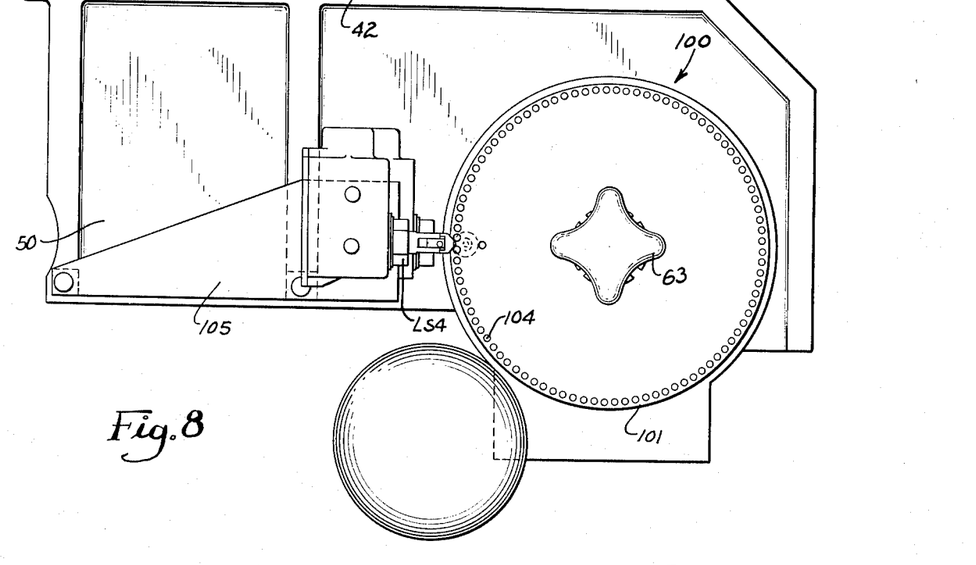
Fig. 8 is an elevational view of the work supporting frame as viewed from the indexing or head end of the spindle.
Figure 9:
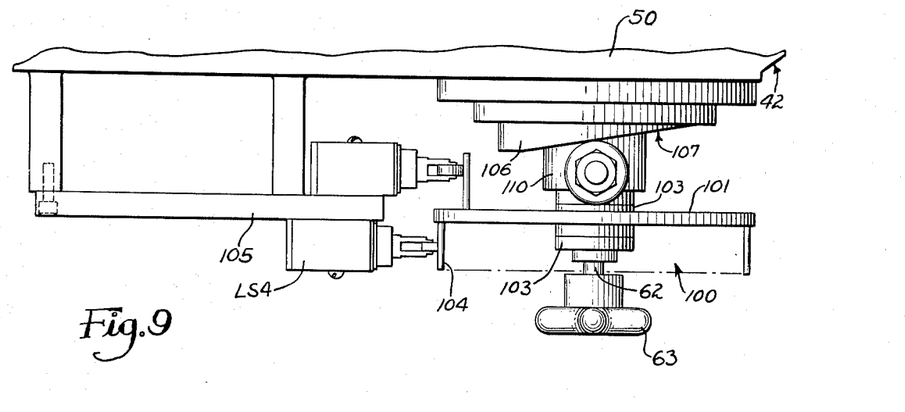
Fig. 9 is a fragmentary plan view showing details of the indexing control mechanism.

Formed in the marginal edge portion of the disk 101 is a circular series of holes in which switch actuating pins 104 may be removably inserted. In the particular machine structure illustrated, the pins 104 project outwardly from the disk, or to the left as shown in Figs. 7, for cooperation with the movable member of the switch LS4 which is supported at one side of the spindle by a bracket 105 bolted or otherwise secured to the end member 50 of the work frame extension 42 (see Figs. 8 and 9).

Preferably the holes for the pins 104 are uniformly spaced apart around the periphery of the disk so that the spindle may be indexed through a complete revolution in uniform steps if desired. When complex articles such as turbine blades are to be produced, holes may be provided for a relatively large number of pins, as for example, 200, thus permitting indexing of the spindle in steps of 1.8°. It should be noted, however, that the pins 104 and removably inserted in the holes so that single pins or a series of them may be withdrawn to increase the angular advance of the spindle as when relatively little material is to be removed from the area of the work presented to the tool. In the case of turbine blades such increases in the length of the indexing steps may be made when the leading and trailing edges of the blade are being shaped.

Reference has been made heretofore to the mounting of the spindle 53 for axial movement relative to its driving and supporting sleeve 56. The spring 58 normally holds the spindle projected to its inner limit position or to the right as viewed in Fig. 7. At times a cutting stroke shorter than that afforded by the reciprocation of the work supporting frame 40 is required, as when the shorter side of a turbine blade having an inclined root portion 65 is presented to the cutter. Under such conditions the frame is allowed to execute its normal stroke and the spindle 53 is retracted to the extent necessitated by the decrease in the length of the cutting stroke required by the workpiece. In such retraction the tail center 71 is correspondingly advanced by its spring 80a thus maintaining adequate support for the workpiece at all times.

Axial positioning of the spindle 53 is effected by a cam 106 (Figs. 7 and 9) mounted on the side member 50 of the frame extension. This cam has an annular cam face 107 forming a track for a follower roller 108 rotatably supported on a stud 109 projecting radially from a collar 110, keyed to the spindle 53 and clamped against movement axially thereon between a shoulder on the spindle and one of the clamping nuts 103. It will be appreciated, of course, that the cam track is shaped in its axial projection so as to provide the proper spindle positioning for the particular workpiece being shaped. The follower roller 108 may be conveniently retained in place on the stud by a nut 111 threaded on the outer end of the stud. When axial shifting of the spindle is not required the shifting means may be rendered inactive without disturbing the cam 106 by simply unscrewing the nut 111 and removing the follower roller.

To insure maximum accuracy in the shaping of the workpiece, provision is made for supporting the portion between centers so as to prevent springing or deflection due to pressure of the tool thereon. More particularly, provision is made for backing up the workpiece at all times opposite the point engaged by the tool. In accordance with the invention such support is provided by back-up mechanism 115 embodying novel features of construction which enable it to conform accurately to the changes in the contour of the workpiece as the latter is indexed to present successive areas to the tool.

Referring now to Figs. 3, 5 and 6, the back-up mechanism 115 in its preferred form comprises a plurality of steady rests or back-up elements 116 arranged in side-by-side relation in a row disposed parallel to the axis of the workpiece and supported for independent movement toward and from the same at the side opposite that on which the tool is working. Each steady rest 116 is, therefore, adapted to engage a limited portion of the workpiece regardless of the curvature of that portion or adjacent areas. During operation of the cutting tool the steady rests 116 are rigidly locked in adjusted positions so as to provide effective backing for the workpiece along the entire portion to be shaped by the tool.

In the exemplary embodiment of the invention as shown in Fig. 5, the steady rests 116 comprise flat steel bars of generally U-shaped configuration, each having one leg rotatably mounted on a shaft 117 journaled in a subframe 118 secured on the upper face of the work supporting frame 40. The shaft 117 is displaced rearwardly of the work supporting spindle 53 so that the other legs of the U-shaped steady rests 116 depend directly over a workpiece carried by the spindle 53. The depending leg of each steady rest is provided with work engaging means herein shown as a roller 119 supported for rotation about an axis parallel to the axis of the workpiece so as to afford a minimum of resistance to the indexing of the same. Preferably the axes of the rollers 119 are staggered from front to rear so as to distribute the supporting action of the steady rests over a substantial area of the workpiece.

To permit retraction of the steady rests 116 as a group for removal and reloading of workpieces, a lost motion connection is provided between each steady rest and the supporting shaft 117. For this purpose the shaft is fitted with a longitudinally extending radially projecting key 120 and each of the elements is formed internally with a keyway 121 for the reception of the key. These keyways are elongated circumferentially of the shaft so that when the latter is rotated to the operative position shown in Fig. 5, each element may rock freely through an angle sufficient to enable it to engage the surface of the workpiece.

When the shaft 117 is turned clockwise, as viewed in Fig. 5, the key 120 picks up the steady rests as it approaches retracted position and carries them along as a group to that position. For retracting the steady rests a hand lever 122 is fixed at one end of the shaft and a detent 123 carried by the lever and engageable in a recess in a member 124 stationarily supported on the frame 40 is effective to hold them in retracted position. As will be seen by reference to Fig. 6, the detent 123 is slidably mounted on the hand lever and is provided at its upper end with a finger grip 125 by which it may be withdrawn against the force of a spring 126 urged toward locking position. Upon withdrawal of the detent and forward swinging of the hand lever, the steady rests swing by gravity into engagement with the work.

As the steady rests 116 are ineffective to provide backing for the work while they are freely swingable about their pivots, provision is made for locking them against movement from their adjusted or work engaging positions while the tool is acting on the work. Preferably the steady rests are locked in place by frictionally clamping them together and to a stationary part of the machine structure. For this purpose the subframe 118 carries an anvil 127 positioned to bear against one side face of the steady rest at one end of the row. At the other end of the row a plunger 128 slidable in a bore 129 in the frame 118 is adapted to engage the steady rest at that end when projected from the bore.

Associated with the other end of the plunger 128 is a piston 130 working in a cylinder 131 axially alined with the bore 129, the outer end of the cylinder being closed by a head 132. The plunger may thus be advanced to clamp the steady rests as a unit against the anvil 127 by introduction of pressure fluid into the outer end of the cylinder 131. As herein shown, a spring 133 interposed between the plunger 128 and the piston 130 serves to return the latter to the outer end of the cylinder when the supply of pressure fluid is cut off. The spring 133 preferably exerts relatively light pressure on the plunger 128 so as not to interfere with the swinging movements of the steady rests into engaging relation with the work surface.

In addition to the pressure fluid operated actuators heretofore described, the exemplary machine is provided with a fluid operated actuator for locking the work holding spindle 53 against accidental movement due to the pressure of the tool on the work. As shown in Figs. 6 and 12, the locking of the work spindle is effected by a series of plungers 135 working in cylinders 136 formed in the spindle bearing element 55. The cylinders are disposed radially with respect to the spindle and are preferably arranged in opposed relation so as to balance the clamping forces acting on the spindle. Upon introduction of pressure fluid into the rear ends of the cylinders the plungers 135 are advanced to press friction shoes 137 against the spindle head with sufficient force to effectively prevent movement of the spindle either from the pressure of the tool on the workpiece or otherwise.

Figures 4, 14, 15:
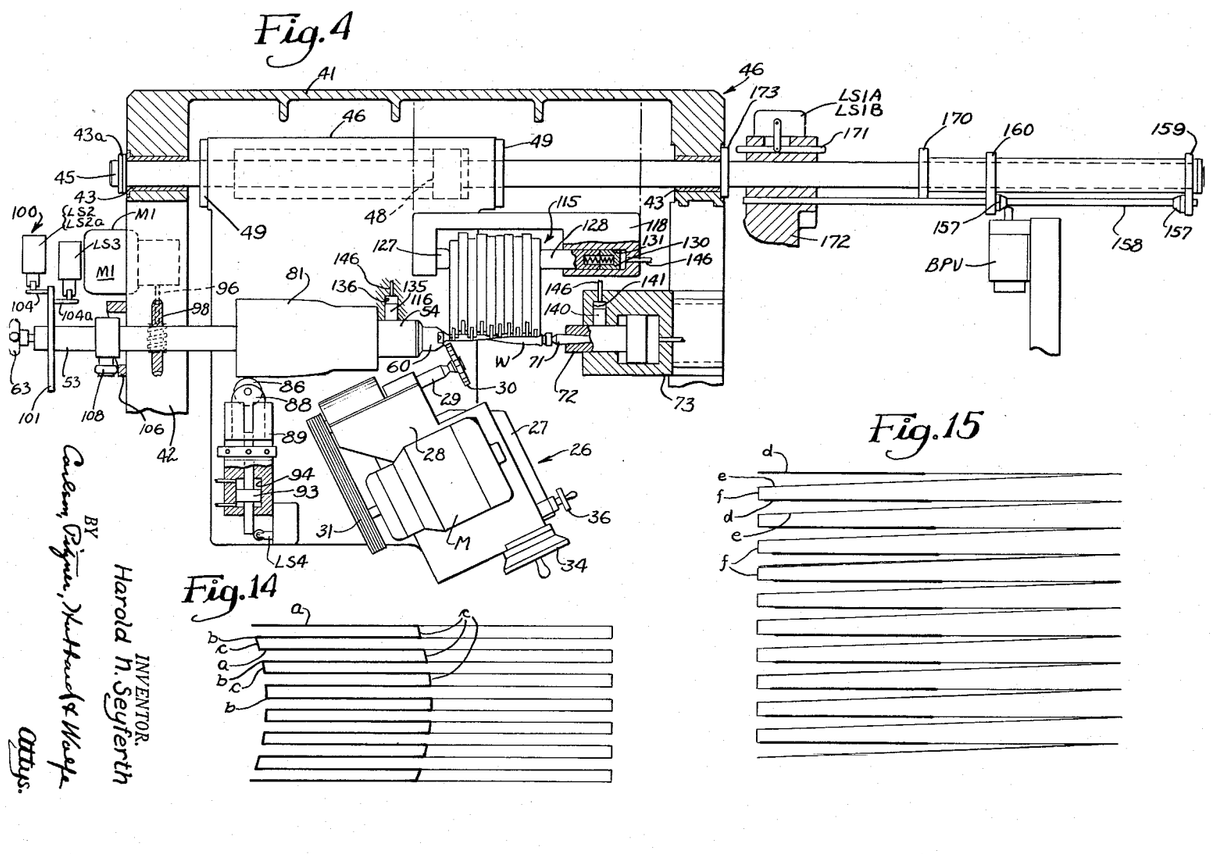
Fig. 4 is a sectional view of the work supporting frame taken in a vertical plane through the pivotal axis of the frame.
Fig. 14 is a diagram showing the relative movements of the tool and work when the machine is set to take cuts in both directions of feed.
Fig. 15 is a diagram similar to Fig. 5 showing cutting in only one direction of movement.

A pressure fluid operated actuator is also provided for clamping the tailstock center slide 72 against movement relative to the work while the cutter is actuating thereon. As shown in Figs. 4 and 12, this actuator comprises a plunger 140 working in a cylinder 141 formed in the bracket 73 which supports the slide. The cylinder extends transversely of the path of movement of the slide and upon introduction of pressure fluid into its rear or outer end, the plunger 140 is shifted inwardly to frictionally engage and clamp the slide.

Referring now to Fig. 12 of the drawings, it will be observed that pressure fluid for operating the fluid actuators of the machine is supplied by a pump P driven by an electric motor M2. The pump draws fluid from a sump or reservoir R and delivers it by way of a working pressure relief valve PRV to a branch pressure line 145. One branch 146 of the pressure line extends to a clamping control valve V2 which controls the delivery of pressure fluid by way of a conduit 147 to the steady rest clamping cylinder 131, the work spindle clamping cylinders 136 and the tailstock slide clamping cylinder 141. A pressure responsive device PR2 connected with the conduit 147 actuates a control switch PR2-1 for control purposes, as will appear presently.

Another branch 148 of the pressure line 145 extends directly to the lower end of the work frame raising cylinder 94 and also to a valve V3 which connects the upper end of the cylinder alternatively to the pressure line or to a drain conduit 149 by way of a conduit 150. A metering valve MV1 including an adjustable orifice member 151 interposed in the conduit 150 controls the rate of delivery of pressure fluid to the cylinder 94 and thus the rate at which the work supporting frame 40 is lowered to present the work to the tool. It will be appreciated that the piston 93 is formed at its upper and lower ends with different effective areas so that the movements are determined by controlling the supply of fluid to the upper end of the cylinder. A passage in the housing of the metering valve fitted with a check valve 152 provides a by-pass around the orifice 151 for the discharge of fluid from the upper end of the cylinder 94. Raising of the work support frame 40 is thus effected at a rapid rate.

A third branch 153 of the pressure line 145 extends to a tranverse control valve V5. This valve includes a spool 154 displaceable in either direction from a central position under control of a solenoid operated pilot valve V6. The traverse valve is connected by conduits 155 and 156 with opposite ends of the work frame traversing cylinder 46 and is settable to connect these conduits alternatively to the pressure line and to the drain conduit 149. Irrespective of the direction of traverse, fluid exhausted from the cylinder 46 is directed through a feed orifice FO1. It may then pass through a second orifice FO2, or by-pass the latter, depending upon the setting of a by-pass valve BPV actuated by cam actuators 157 reciprocable with the frame 40. As shown in Fig. 4, these cams are carried by a rod 158 supported and confined between a pair of collars 159 and 160 rigidly mounted on the piston rod 145 adjacent one end thereof. A solenoid operated feed control valve V7 is also interposed in the by-pass line.

A novel control system constituting an important part of the present invention controls and coordinates the operations of the various machine elements and actuators so that the machine attendant is merely required to load the workpiece in the machine, start the operating cycle and finally remove the finished workpiece. In other words, the controls automatically regulate the timing and sequence of the various operations involved in shaping the workpiece and then stop the machine upon completion of the cycle.

The control system herein shown is adapted to operate the improved machine tool in accordance with either of two different operating cycles. Thus, as illustrated diagrammatically in Fig. 14, the controls may provide for presentation of the work to the tool in both the forward and return strokes of the work supporting frame 40. In the drawing, the lines *a* indicate effective cutting strokes with the work moving to the right and the lines *b* cutting strokes with the work moving to the left. At the end of each cutting stroke *a* and *b*, the work carrying spindle 53 is rotatably indexed so as to present a succeeding area of the workpiece to the tool, the indexing movements being indicated by the lines *c*.

In the working cycle illustrated diagrammatically in Fig. 15, the cutting strokes are in one direction only, that is, they take place with the work moving toward the right as indicated by the lines *d*. The return strokes of the work carrying frame are executed with the frame in a raised position and therefore with the work out of operative engagement with the tool, as indicated by the lines *e*. Indexing of the work spindle takes place only on alternate strokes of the work frame as, for example, at the ends of the return strokes as indicated by the lines *f*.

The control system is preferably operated at low voltage, operating current being obtained in this instance from a step-down transformer T (Fig. 13) having its primary winding connected across two of the leads of a three wire power line L which supplies current to the driving motors M, M1 and M2, and various auxiliaries such as a coolant circulating pump, oil heater, etc., which form no part of the present invention.

To place the machine in operation, a starting switch S1 is closed manually to energize motor starting relay MR. The relay closes switch MR1 to connect pump motor M2 across the line L. The relay also closes a holding circuit for itself at switch MR2 so that it remains energized until its circuit is interrupted by the opening of a master stop switch S2.

Figure 13:
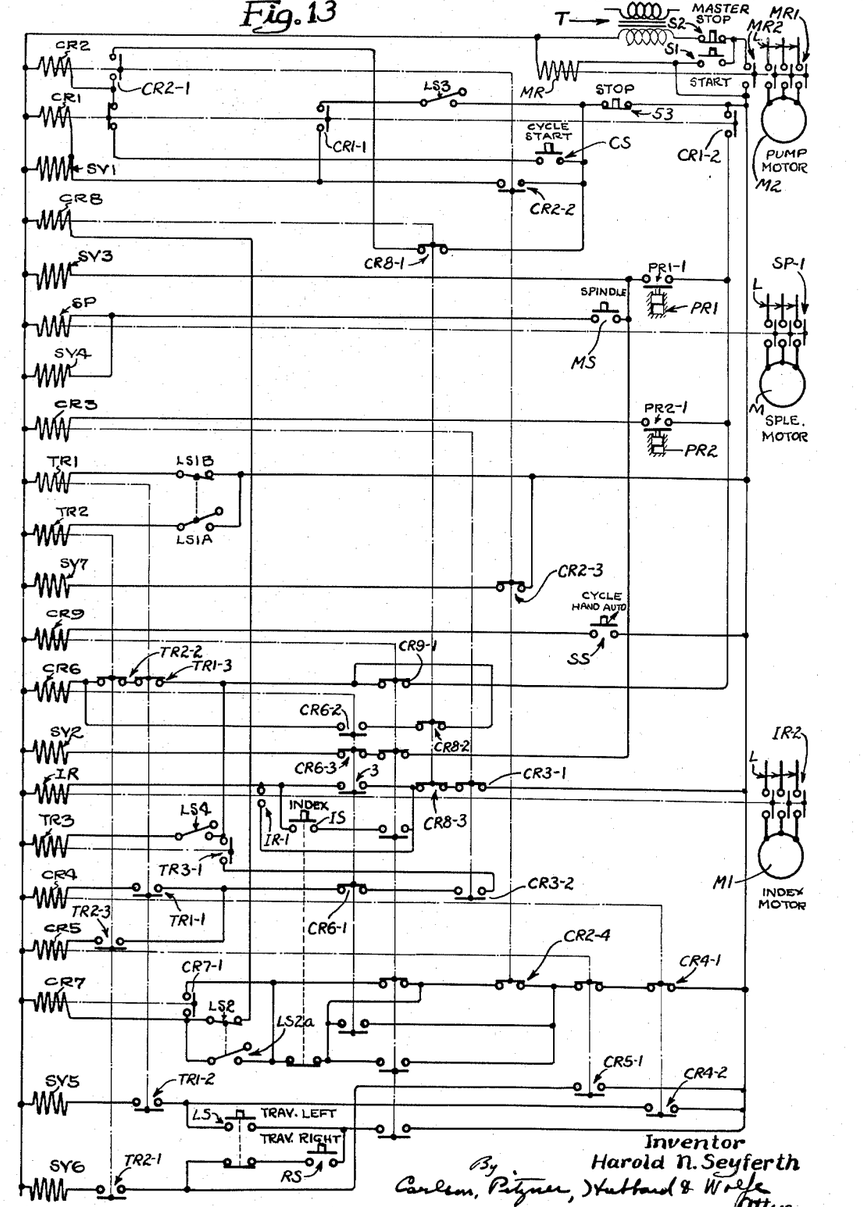
Fig. 13 is a schematic diagram of the electrical circuit of the machine.

With the other elements of the control switch in the condition shown in Fig. 13, and with the spindle, tailstock and steady rest clamps released, the work supporting frame 40 in a raised position, and the steady rests 116 retracted, the workpiece W is loaded in the chuck 60 and the chuck jaws are closed by manipulation of the knob 63. The tailstock slide 72 may be advanced manually at this time by means of the hand lever 78. If not advanced manually, the associated pressure fluid actuator later effects such advance to engage the center 71 with the workpiece. Steady rests 16 are lowered into engagement with the work by rocking the hand lever 122 forward.

Assuming that the machine is to be operated through an automatic cycle with the tool cutting in both directions of movement of the workpiece, a two position cycle selector switch SS is set in the automatic or open position in which it is shown in Fig. 13. The spindle motor starting circuit is prepared by manual closure of a motor switch MS, the switch being of the type which remains in closed position until manually reoperated to open position. This circuit remains ineffective until pressure responsive switch PR1–1 is closed.

With the work properly loaded as above described, the cycle is started by momentary closure of a cycle starting switch CS. Closure of the switch CS energizes a control relay CR2 which completes a holding circuit for itself by closing switch CR2–1, the circuit including a normally closed switch CR8–1 of relay CR8 and a normally closed manually operable stop switch S3. Relay CR2 also closes switch CR2–2 to energize a control relay CR1 and center in solenoid SV1. In addition relay CR2 opens normally closed switches CR2–3 and CR2–4 for purposes which will become apparent as the description proceeds.

Relay CR1 upon energizing prepares a holding circuit for itself by closing switch CR1–1 and it also prepares circuits for other relays and solenoids by closing switch CR1–2. Solenoid SV1 upon energizing shifts control valve V1 to direct pressure fluid into the outer end of the cylinder 141. When the tailstock center 71 engages the workpiece, the pressure in the supply conduit operates the pressure responsive device PR1 to close the switch PR1–1.

As a result of the opening of switch CR2–3 normally energized solenoid SV7 is deenergized, allowing the spring biased valve V7 to close the by-pass around feed orifice FO2. This feed orifice is set for a slower discharge rate than the companion feed orifice FO1 and consequently when the discharge from the cylinder 46 is directed through both orifices the orifice FO2 determines the discharge rate and the work frame 40 is advanced at a slow rate. When the orifice FO2 is by-passed orifice FO1 determines the rate of discharge from the feed cylinder and the work frame is therefore advanced at a more rapid rate.

Closure of pressure switch PR1–1 initiates a number of different actions. It completes the circuit for the spindle motor relay SP which energizes to close switch SP–1 for connecting spindle drive motor M across the line L. It completes a circuit for energizing a solenoid SV4 which opens a coolant supply valve (not shown) to initiate the flow of coolant through a conduit 165 (Fig. 1), manifold 166 and nozzle 167 to the workpiece.

Closure of switch PR1–1 also completes an energizing circuit for clamping solenoid SV2 which operates the spring biased valve V2 to direct pressure fluid through conduit 147 to the spindle, tailstock and steady rest clamping cylinders 136, 141 and 131. When each of the clamps is effectively engaged, the pressure responsive device PR2 operates to close switch PR2–1.

As a further result of the closure of switch PR1–1, solenoid SV3 is energized to shift the spring biased valve V3 to a position to direct pressure fluid through the conduit 150 to the upper end of the cylinder 98. Slide 88 and follower roller 86 are accordingly shifted downwardly at a rate determined by the setting of the orifice 151 in the metering valve MV1. It will be recalled that contour control cam 81 on the work supporting spindle rests on the follower roller 86 and consequently the work supporting frame 40 and elements carried thereby moves downwardly with the follower roller under the influence of its weight, assisted by a heavy coil spring 168 (Fig. 1) connected between the frame 40 and the base 20 of the machine.

Closure of the switch PR2–1 completes a circuit for energizing relay CR3 which opens a switch CR3–1 and closes a switch CR3–2. The latter prepares a circuit for relay CR4 to be completed subsequently.

As the work supporting frame 40 approaches its lower limit position, an actuator 154 mounted on the extension 96 at the lower end of the follower roller actuating piston 93 engages and closes a limit switch LS4. Closure of this limit switch completes a circuit by way of normally closed contacts CR6–1 or relay CR6 for a delayed action relay TR3. The latter relay closes switch TR3–1 to complete a circuit for energizing relay CR4, such circuit including switch CR3–2 closed upon the energization of relay CR3, normally closed switch CR6–1 and switch TR1–1 closed when delayed action relay TR1 is energized. The latter relay incidentally is energized when the pump motor is started in a circuit including a normally closed limit switch LS1B.

Relay CR4 opens switch CR4–1 in the circuit of relay CR7 and closes switch CR4–2 to complete a circuit for solenoid SV5. This circuit also includes a switch TR1–2 closed when relay TR1 is energized. Solenoid SV5 shifts the pilot valve V6 to a position to direct pressure fluid to the right end of the cylinder 46, thus initiating feed movement of the work supporting frame 40 to the left. This feed movement proceeds at the slow feed rate by reason of the setting of the valve V7. During such movement the cam 81 riding on the follower roller 86 shifts the work frame upwardly or permits it to descend to vary the depth of cut taken by the cutter 30 so that the workpiece is progressively machined to the contour represented by the cam.

As the work supporting frame 40 approaches the end of its working stroke, a stop collar 170 (Fig. 4) fixed to the piston rod 45 engages a plunger 171 slidably supported in a bracket 172 extending upwardly from the machine frame and shifts the plunger to the left. The plunger in its initial movement opens limit switch LS1B and, after a slight additional movement closes limit switch LS1A.

The opening of switch LS1B deenergizes relay TR1 which, in turn, opens switches TR1–1 and TR1–2 to deenergize control relay CR4 and solenoid SV5. Closure of limit switch LS1A completes a circuit for energizing delayed action relay TR2 which closes switch TR2–1 to prepare an energizing circuit for solenoid SV6. The deenergization of solenoid SV5 permits the pilot valve V6 to return to central or neutral position. Traverse valve V5, however, remains in operated position and the work frame continues its movement to the left until the collar 155 engages a fixed stop on the bracket 172 which positively stops the frame.

Upon deenergization, relay TR1 closes switch TR1–3 to complete an energizing circuit for relay CR6, such circuit including switches TR2–2 and CR9–1. Relay CR6 upon energizing completes a holding circuit for itself by closing switch CR6–2, which holding circuit is independent of the switches in its energizing circuit and which additionally includes a switch CR8–2. Energization of relay CR6 is timed to take place immediately after the opening of the limit switch LS1B and prior to the closure of limit switch LS1A which latter switch completes an energizing circuit for delayed action relay TR2.

Relay CR6 upon energizing closes switch CR6–2 so as to maintain energization of the relay upon the opening of switch TR2–2. Relay CR6 also opens its switch CR6–3 to interrupt the circuit for solenoid SV2 which deenergizes and releases the spring biased clamping valve V2. Valve V2 accordingly releases the spindle, tailstock and steady rest clamps and pressure responsive device PR2 opens switch PR2–1. This results in the deenergization of relay CR3 which opens switch CR3–2 and closes switch CR3–1. Closure of switch CR3–1 completes an energizing circuit by way of switches CR8–3 and CR6–3 for energizing indexing relay IR. The latter completes a holding circuit for itself by closing switch IR–1 and also closes switch IR–2 to connect indexing motor M1 across the line L. Motor M1 now drives the work carrying spindle 53 to index the work for presentation of another area for action by the tool.

As explained heretofore, the length of the indexing step imparted to the spindle 53 is determined by the spacing of the pins 104 on the control disk 101. As the spindle starts rotation the pin in engagement with limit switch LS2 is withdrawn, allowing that switch to open and the companion switch LS2A to close. Upon closure of the latter limit switch, relay CR7 is energized and closes switch CR7–1 to complete a holding circuit for itself. Indexing continues until the next adjacent pin 104 engages and closes limit switch LS2 and opens switch LS2A. Upon reclosure of switch LS2, relay CR8 is energized in parallel with relay CR7 and opens switches CR8–1, CR8–2 and CR8–3.

In the initial turning of the spindle 53, a control pin 104a projecting from the rear face of the disk 101 is withdrawn from engagement with a limit switch LS3 permitting the switch to close. This completes a holding circuit for relay CR1 and solenoid SV1 independently of switch CR2–2.

The opening of switch CR8–1 effects the deenergization of relay CR2 which, in turn, closes switch CR2–3 to reenergize solenoid SV7. Reenergization of the solenoid shifts valve V7 to its alternate position which has no immediate effect while the work support is stopped in its left-hand limit position but sets up the hydraulic circuit for rapid return movement. Such movement is controlled by the by-pass valve BPV which, as explained heretofore, is actuated by suitable cams on the piston rod 45 and which opens or closes the by-pass circuit established by way of the valve V7.

Opening of the switch CR8–3 releases index relay IR which opens the circuit for the indexing motor M1. The opening of switch CR8–2 effects the deenergization of relay CR6 which, in the manner heretofore explained, completes the energizing circuit for solenoid SV2 which sets the clamping valve V2 to effect clamping of the work spindle, the tailstock and the steady rests.

When the clamps are reengaged, pressure switch PR2–1 closes to energize relay CR3 which, by closing contacts CR3–2, energizes relay CR5 by way of the now closed switch TR2–3. Relay CR5 closes switch CR5–1 to complete the circuit for solenoid SV6 previously prepared by closure of switch TR2–1. Solenoid SV6 energizes and shifts the pilot valve V6 to its alternate position and the pilot valve, in turn, shifts the spool of valve V5 so as to direct pressure fluid to the left end of the feed cylinder 46.

The work supporting frame 40 is accordingly traversed to the right at slow or milling feed. At the end of the feed stroke, a stop collar 173 on the piston rod 45 engages and shifts the plunger 171 to its alternate position opening limit switch LS1A and closing switch LS1B. The opening of switch LS1A deenergizes relay TR2 which opens switch TR2–1 to deenergize solenoid SV6. Pilot valve V6 returns to neutral position but traverse valve V5 is unchanged and the work frame 40 continues its movement to the right until stopped by engagement of the collar 173 with a fixed stop on the bracket 172.

The closure of switch LS1B energizes relay TR1 which prepares a circuit for the solenoid SV5 in preparation for the next movement of the work supporting frame 40 to the left. Energization of relay CR6 deenergizes the solenoid SV2 to release clamping valve V2 which relieves the clamping pressure on the work spindle, the tailstock slide and steady rests. From this point on the operation proceeds exactly as described heretofore with the indexing of the spindle, reclamping, and initiation of feed to the left of the work frame. The feed and indexing operations are repeated alternately through the number of steps for which the indexing mechanism 100 has been set. When the workpiece requires indexing through a complete revolution as in the exemplary embodiment here disclosed, the last indexing step brings the control pin 104a into engagement with the limit switch LS3 to open the same and thus interrupt the holding circuit for the relay CR1 and solenoid SV1. The deenergization of solenoid SV1 releases pressure from the tailstock center and pressure responsive device PR1 opens switch PR1-1. Clamping solenoid SV2 is then deenergized, setting the valve V2 to release the clamps for the work spindle, tailstock slide and steady rests. Pressure responsive device PR2 opens switch PR2-1.

Upon the opening of switch PR1-1 solenoid SV3 is deenergized, setting valve V3 to connect the upper end of cylinder 94 to the drain 149. Pressure fluid supplied to the lower end of the cylinder shifts the piston 93 upwardly and through the follower roller 86 raises the work supporting frame 40 to its upper retracted position. Such movement takes place at a rapid rate since the fluid from the upper end of the cylinder 94 is discharged by way of the check valve 152 and thus by-passes the orifice 151. Spindle motor relay SP is deenergized to open switch SP-1 and stop the spindle motor and solenoid SV4 deenergizes to close the coolant valve and thus interrupt the flow of coolant. The workpiece may now be unloaded from the machine and a new workpiece loaded therein for the next cycle as previously described.

When setting up the machine the cycle selector switch may be turned to the "Hand" position in which the switch is closed. The workpiece is loaded into the machine and operation is started by actuation of the cycle start switch CS, as previously explained. The cycle then proceeds to the point at which the work is lowered into engagement with the cutter. No traverse takes place, however, until one or the other of the traverse pushbutton switches LS or RS is actuated manually. When switch LS is closed traverse to the left is initiated and continues as long as the switch is held closed. Switch RS when closed initiates movement in the opposite direction, or to the right, and movement continues only while the switch remains closed.

Indexing of the work spindle may be effected at any desired position by manual actuation of the indexing switch IS which energizes relay IR and initiates a single indexing step. Such indexing steps may be repeated until the work is rotated through a full revolution, whereupon the limit switch LS3 is opened by the control pin 104a to condition the machine for unloading. If it is desired to unload the workpiece before the starting position is reached, a momentary closure of the stop cycle switch S3 will initiate the operations required to permit unloading. After such operation it is necessary to actuate the index switch IS repeatedly to return the work holding spindle to starting position.

When the machine is operating in an automatic cycle, operation may be stopped at any time by closure of the stop cycle switch S3. The work supporting frame 40 will be brought to rest in its raised position exactly as at the end of a normal cycle and the clamps will be released so that the workpiece may be removed or replaced. The cycle may be resumed by merely closing the start switch CS. In case of an emergency all of the motors may be stopped and the control system rendered ineffective by momentary operation of the master stop switch S2.

For convenience of operation, the various manually operable switches may be mounted on a panel 175 suitably supported at one end of the machine frame. Fig. 1 shows the panel in a preferred location although it will be understood that other locations may be selected if desired.

It will be apparent from the foregoing that the invention provides a machine tool of novel and advantageous character for shaping workpieces having complex curved surfaces. Through the novel arrangement for supporting the workpiece and for presenting it to the cutting tool, loading and unloading is facilitated and the time required to traverse the tool over the entire work surface is reduced to a minimum. Moreover, by reason of the novel controls provided by the invention, operation of the machine is substantially automatic and little or no supervision is required from the attendant. The overall time required for producing complicated workpieces such as turbine blades is, therefore, reduced to a minimum with substantial saving in costs.

The improved machine not only reduces production time but also produces work precisely shaped and dimensioned in conformity with a master cam. This is due in part to the novel mechanism provided for supporting the intermediate portion of the workpiece while the tool is operating thereon and to the accurate control of cutting depth provided by the barrel type cam and follower arrangement employed. Furthermore, the arrangement permits the use of a cam which can be produced quickly and cheaply from a master pattern exhibiting the contour to be machined on the finished workpiece.

I claim as my invention:

1. In a machine tool, in combination, a base, bearing means on said base, a work supporting frame oscillatable about an axis passing through said bearing means and longitudinally slidable along said axis, work supporting means on said frame including a spindle adapted to rotate about an axis parallel to said first axis, means on said spindle for holding a workpiece to rotate the same coaxially therewith, an elongated rotary cam fixed on said spindle for rotation coaxially therewith, means for rotating said spindle, means for longitudinally traversing said work supporting frame along the axis of said bearing means, a tool slide supported on said base and adjustable toward and from the axis of the workpiece, a rotatably driven tool on said tool slide having its cutting periphery positioned tangentially to engage the workpiece held by said spindle, a cam follower adjustably supported on said base and positioned to engage said rotary cam to oscillate said work holding frame about said bearing axis upon rotation or translation of said elongated cam according to the contour thereof, and means for adjusting said cam follower to effect a change in the radial distance between the work axis and the periphery of the tool, and other means for shifting said cam follower so as to shift said work supporting frame to a remote work loading and unloading position wherein separation exists between the workpiece and the periphery of said tool.

2. In a machine tool, in combination, a base, bearing means on said base, a work supporting frame oscillatable about an axis passing through said bearing means and longitudinally slidable along said axis, work supporting means on said frame including a spindle adapted to rotate about an axis parallel to said first axis, means on said spindle for holding a workpiece to rotate the same coaxially therewith, an elongated rotary cam fixed on said spindle for rotation coaxially therewith, means for rotating said spindle, means for longitudinally traversing said work supporting frame along the axis of said bearing means, a tool slide supported on said base and adjustable toward and from the axis of the workpiece, a rotatably driven tool on said tool slide having its cutting periphery positioned tangentially to engage the workpiece held by said spindle, a cam follower adjustably mounted on said base and positioned to engage said rotary cam to oscillate said work holding frame about said bearing axis upon rotation or translation of said elongated cam according to the contour thereof, and pressure fluid operated means for shifting said cam follower to move said work supporting frame to a remote work loading and unloading position wherein the workpiece is spaced substantially from the periphery of said tool.

3. In a machine tool, in combination, a base, a tool slide adjustably supported on said base, a rotatably driven tool carrying spindle journaled on said slide, a frame supported on said base for linear movement in a plane including the axis of said spindle and for independent movement transversely of said axis toward and from the spindle, a spindle journaled on said frame and adapted to hold a workpiece, power actuated means for imparting linear movements to said frame, a cam supported on said frame and a cooperating cam follower supported on said base, said cam coacting with said follower in the linear movement of said frame to vary the depth of cut taken on the workpiece by the tool carried on said spindle in accordance with the contour of said cam, means for rotating said work holding spindle in incremental steps, a control member rotatable with said work holding spindle, a plurality of control elements supported on and rotatable with said member, and a control device engageable by said elements to interrupt the operation of said rotating means, the positions of said elements relative to each other being changeable to vary the lengths of the rotative steps imparted to the work holding spindle.

4. In a machine tool, in combination, a base, a tool slide adjustably supported on said base, a rotatably driven tool carrying spindle journaled on said slide, a frame supported on said base for linear movement in a plane including the axis of said spindle and for independent movement transversely of said axis toward and from the tool spindle, power actuated means for imparting linear movements to said frame, rotatable means on said frame for holding a workpiece, a cam supported on said frame and a cooperating cam follower supported on said base, said cam coacting with said follower in the linear movement of said frame to vary the depth of cut taken on the workpiece by the tool carried on said spindle in accordance with the contour of said cam, a control disk mounted on and rotatable with said work holding means, said disk having a circular series of holes in its marginal edge portion, control pins removably insertable in said holes, and a control device positioned for engagement by said pins in the rotation of said disk.

5. In a machine tool, in combination, a base, a tool slide adjustably supported on said base, a rotatably driven tool carrying spindle journaled on said slide, a frame supported on said base for linear movement in a plane including the axis of said spindle and for independent movement transversely of said axis toward and from the tool spindle, rotatable means on said frame for holding a workpiece, power actuated means for imparting linear movements to said frame, a cam supported on said frame and a cooperating cam follower supported on said base, said cam coacting with said follower in the linear movement of said frame to vary the depth of cut taken on the workpiece by the tool carried on said tool spindle in accordance with the contour of said cam, a control disk mounted on and rotatable with said work holding means, said disk having a circular series of holes in its marginal edge portion, control pins removably insertable in said holes, a control device operative when actuated to interrupt the rotation of said work supporting means, and means supporting said device for engagement by said pins in the rotation of said disk.

6. In a machine tool, in combinaiton, a base, a tool slide adjustably supported on said base, a rotably driven tool carrying spindle journaled on said slide, a frame supported on said base for linear movement in a plane including the axis of said spindle and for independent movement transversely of said axis toward and from the spindle, rotatable means on said frame for holding a workpiece, power actuated means for imparting linear movements to said frame, a cam supported on said frame and a cooperating cam follower supported on said base, said cam coacting with said follower in the linear movement of said frame to vary the depth of cut taken on the workpiece by the tool carried on said spindle in accordance with the contour of said cam, and means for intermittently rotatably indexing said work holding means and said cam through steps of corresponding length.

7. In a machine tool, in combination, a base, a tool slide adjustably supported on said base, a rotatably driven tool carrying spindle journaled on said slide, a frame supported on said base for linear movement in a plane including the axis of said spindle and for independent movement transversely of said axis toward and from the spindle, work supporting means on said frame for holding a workpiece to be operated on by the tool carried on said spindle, power actuated means for imparting linear movements to said frame, a cam supported on said frame and a cooperating cam follower supported on said base, said cam coacting with said follower in the linear movement of said frame to vary the depth of cut taken on the workpiece by the tool in accordance with the contour of said cam, power operated means for rotating said work supporting means and said cam, and control mechanism rotatable with said work supporting means for controlling said rotating means to determine the extent of rotation imparted to the work supporting means.

8. In a machine tool, in combination, a base, a rotatably driven tool supported in a fixed position on said base, a frame, a spindle journaled on said frame adapted to support a workpiece, means supporting said frame on said base for linear movement along a path parallel to the axis of the spindle so as to feed the workpiece past the tool and for pivotal movement toward and from the tool, control means operative to confine the reciprocation of said frame within predetermined limits and thereby determine the length of the cutting stroke of the tool, and other means for shifting said spindle axially relative to the frame to vary the length of the cutting stroke while the frame continues to reciprocate within said limits.

9. In a machine tool, in combination, a bed, a frame, means supporting said frame on said bed for linear translation and for pivotal movement on an axis parallel to its translatory path, said supporting means comprising a cylinder mounted on said bed, a piston reciprocable in said cylinder, a piston rod operatively secured to said piston and projecting at oposite ends of the cylinder, bearings on said frame rotatably engaging the projecting ends of said piston rod, and abutment means on said piston rod constraining at least one of said bearings and said frame to reciprocate with the piston rod.

10. In a machine tool having means for supporting a workpiece for presentation of a tool to one side thereof, means preventing deflection of the workpiece by the pressure of the tool comprising a plurality of steady rests disposed in side by side relation and each having a workpiece engaging portion, means supporting said steady rests for independent movement to operated positions with said portions in contact with the workpiece in opposed relation to the tool, and means for clamping said steady rests together as a unit and for retaining them in their respective operated positions.

11. In a machine tool, in combination, a rotatably mounted spindle for supporting one end of an elongated workpiece, a tailstock center for supporting the other end of the workpiece, means for rotatably indexing said spindle intermittently in steps of predetermined length to present successive areas of the workpiece to a tool, a plurality of steady rests freely and independently movable into engagement with the workpiece intermediate its ends, clamping mechanisms respectively operable to clamp said spindle, said tailstock center and said steady rests in fixed positions, and control means for initiating operation of said mechanisms between successive indexings of said spindle.

12. In a machine tool having a work supporting frame mounted for pivotal movement, means for positioning said frame including a cam mounted on the frame, a follower roller engageable by said cam, a support for said roller including a slide movable transversely of the pivotal axis of the frame, means for locating said frame in a working position including adjustable stop means associated with said slide, and means for shifting said frame from said working position to a retracted position including a pressure fluid operated actuator associated with said slide, valve means controlling the flow of pressure fluid to and from said actuator including flow restricting means for limiting the movement of the slide in one direction to a relatively slow speed, and means for by-passing said restricting means to permit movement of the slide in the other direction at a substantially higher speed.

13. In a machine tool having a work supporting frame mounted for pivotal movement, means for positioning said frame including a cam mounted on the frame, a follower roller engageable by said cam, a support for said roller including a slide movable transversely of the pivotal axis of the frame, means for locating said frame in a working position including adjustable stop means associated with said slide, and means for shifting said frame from said working position to a retracted position including a pressure fluid operated actuator associated with said slide, and valve means controlling the flow of pressure fluid to and from said actuator.

14. In a machine tool having a work supporting frame mounted for pivotal movement, means for positioning said frame including a cam mounted on the frame, a follower roller engageable by said cam, a support for said roller including a slide movable transversely of the pivotal axis of the frame, stop means defining a limit position for said slide, and pressure fluid operated means for shifting said slide away from said stop means.

15. In a machine tool, in combination, a base, a rotatably driven tool supported on said base, a frame supported on said base to rock about an axis spaced laterally from the tool and for linear translation along said axis, power actuated means for rocking said frame, a second power actuated means for translating said frame, means on said frame supporting a workpiece in position to be presented to the tool upon rocking of said frame in one direction, a third power actuated means operable to rotate said work supporting means in incremental steps, control mechanism including devices operable to control the operation of said second power actuated means so as to reciprocate said frame, other control devices included in said mechanism for initiating operation of said first power actuated means so as to rock said frame to a retracted position at the end of each stroke of the frame and to rock it back to working position before the next stroke is initiated, and still other control devices included in said mechanism for initiating operation of said third power actuated means while said frame is in retracted position.

16. In a machine tool, in combination, a base, a rotatably driven tool supported on said base, a frame supported on said base to rock about an axis spaced laterally from the tool and for linear translation along said axis, power actuated means for rocking said frame, a second power actuated means for translating said frame, means on said frame supporting a workpiece in position to be presented to the tool upon rocking of said frame in one direction, a third power actuated means operable to rotate said work supporting means in incremental steps, control mechanism including devices operable to initiate operation of said second power actuated means to traverse said frame through a predetermined stroke in one direction, control devices operable to initiate operation of said first power actuated means to rock said frame to its operated positions at the beginning of said stroke and to return it to retracted position at the end of the stroke, control devices for initiating operation of said third power actuated means while said frame is in retracted position, control devices for initiating operation of said second power actuated means to traverse said frame in a return stroke.

17. In a machine tool, in combination, a base, a rotatably driven tool supported on said base, a frame supported on said base to rock about an axis spaced laterally from the tool and for linear translation along said axis, power actuated means for rocking said frame, a second power actuated means for translating said frame, means on said frame supporting a workpiece in position to be presented to the tool upon rocking of said frame in one direction, a third power actuated means operable to rotate said work supporting means in incremental steps, control mechanism including devices for initiating operation of said power actuated means in predetermined timed relation to effect in sequence the rocking of said frame to operating position, the traverse of the frame in one direction through a predetermined stroke, the rocking of the frame to retracted position at the end of said stroke, the rotation of said work supporting means through an incremental step, the rocking of the frame to operating position, and the traverse of the frame in the opposite direction through a predetermined stroke.

18. In a machine tool, in combination, a base, a rotatably driven tool supported on said base, a frame supported on said base to rock about an axis spaced laterally from the tool and for linear translation along said axis, power actuated means for rocking said frame, a second power actuated means for translating said frame, means on said frame supporting a workpiece in position to be presented to the tool upon rocking of said frame in one direction, a third power actuated means operable to rotate said work supporting means in incremental steps, control mechanism including devices for initiating operation of said power actuated means in predetermined timed relation to effect in sequence the rocking of said frame to operating position, the traverse of the frame in one direction through a predetermined stroke, the rocking of the frame to retracted position at the end of said stroke, the traverse of said frame in the opposite direction through a predetermined stroke, the rotation of said work supporting means through an incremental step, and the rocking of said frame back to operating position, the return of said frame to operating position acting to initiate the repetition of the foregoing cycle of operations.

References Cited in the file of this patent

UNITED STATES PATENTS

| Number | Name | Date |
|---|---|---|
| 281,856 | Fifield | July 24, 1883 |
| 464,875 | Hueffner | Dec. 8, 1891 |
| 741,209 | Wright | Oct. 13, 1903 |
| 1,000,516 | Hanson et al. | Aug. 15, 1911 |
| 1,254,749 | Wells | Jan. 29, 1918 |
| 1,325,671 | Heath | Dec. 23, 1919 |
| 1,389,835 | Lecomte | Sept. 6, 1921 |
| 1,496,355 | Mueller | June 3, 1924 |
| 1,524,614 | Cardullo | Jan. 27, 1925 |
| 1,651,432 | Bath et al. | Dec. 6, 1927 |
| 1,783,755 | Trefethen et al. | Dec. 2, 1930 |
| 1,906,577 | Groene | May 2, 1933 |
| 1,928,150 | Douglas | Sept. 26, 1933 |
| 1,932,185 | Lentz | Oct. 24, 1933 |
| 1,961,091 | Smith et al. | May 29, 1934 |
| 2,086,915 | Kopp | July 13, 1937 |
| 2,110,530 | Saives | Mar. 8, 1938 |
| 2,113,716 | Berliner | Apr. 12, 1938 |
| 2,222,563 | Green | Nov. 19, 1940 |
| 2,292,587 | Terbrueggan | Aug. 11, 1942 |
| 2,321,281 | Collins | June 8, 1943 |
| 2,362,533 | Bollweric | Nov. 14, 1944 |
| 2,372,787 | Licwinka | Apr. 3, 1945 |
| 2,431,604 | Birmann | Nov. 25, 1947 |
| 2,441,150 | Jenkins | May 11, 1948 |
| 2,453,600 | Soden | Nov. 9, 1948 |
| 2,480,807 | De Vlieg | Aug. 30, 1949 |
| 2,569,096 | Geiger et al. | Sept. 25, 1951 |

FOREIGN PATENTS

| Number | Country | Date |
|---|---|---|
| 650,279 | Great Britain | May 7, 1948 |